United States Patent
van Bemmel (10) Patent No.: US 9,852,074 B2
(45) Date of Patent: Dec. 26, 2017

(54) CACHE-OPTIMIZED HASH TABLE DATA STRUCTURE

(71) Applicant: ALCATEL-LUCENT CANADA, INC., Ottawa (CA)

(72) Inventor: Jeroen van Bemmel, Calgary (CA)

(73) Assignee: Alcatel Lucent, Boulogne-Billancourt (FR)

( * ) Notice: Subject to any disclaimer, the term of this patent is extended or adjusted under 35 U.S.C. 154(b) by 376 days.

(21) Appl. No.: 14/594,393

(22) Filed: Jan. 12, 2015

(65) Prior Publication Data
US 2016/0203082 A1    Jul. 14, 2016

(51) Int. Cl.
*G06F 12/08*     (2016.01)
*G06F 12/0864*   (2016.01)
*G06F 12/0895*   (2016.01)

(52) U.S. Cl.
CPC ...... *G06F 12/0864* (2013.01); *G06F 12/0895* (2013.01)

(58) Field of Classification Search
CPC .................. G06F 12/0864; G06F 12/0895
USPC .................. 711/128, 154, 156, 216, 221
See application file for complete search history.

(56) References Cited

U.S. PATENT DOCUMENTS

| | | | | |
|---|---|---|---|---|
| 5,197,146 A * | 3/1993 | LaFetra | ............... | G06F 12/0824 711/120 |
| 6,408,363 B1 * | 6/2002 | Lesartre | ............... | G06F 9/3834 711/135 |
| 6,493,812 B1 * | 12/2002 | Lyon | ............... | G06F 12/1054 711/108 |
| 6,643,766 B1 * | 11/2003 | Lesartre | ............... | G06F 12/0862 711/137 |
| 7,124,243 B2 * | 10/2006 | Burton | ............... | G06F 12/0871 711/113 |
| 7,380,059 B2 * | 5/2008 | Burton | ............... | G06F 12/0862 711/113 |
| 2007/0260846 A1 * | 11/2007 | Burton | ............... | G06F 12/0862 711/216 |
| 2008/0204451 A1 * | 8/2008 | Im | ............... | G06T 15/005 345/419 |
| 2012/0216015 A1 * | 8/2012 | Mitra | ............... | G06F 9/4552 712/28 |
| 2015/0347307 A1 * | 12/2015 | Walker | ............... | G06F 12/0882 711/3 |

OTHER PUBLICATIONS

Herlihy, et al., "Hopscotch Hashing", Proceedings of the 22nd International Symposium on Distributed Computing (DISC 2008), 16 pages.

* cited by examiner

*Primary Examiner* — Stephen Elmore
(74) *Attorney, Agent, or Firm* — Kramer & Amado, P.C.

(57) ABSTRACT

Various exemplary embodiments relate to a system for hashing a value into a cache, the system including a processor for performing a series of instructions; a memory; and the cache including a plurality of slots, each slot including two locations to store values, each location comprising a tag value and an index, the cache in communication with the memory and the processor, the cache configured to calculate a target slot in the cache for an object, determine if a location is available, store a characteristic of the object in the index of the location, and update the tag value of the location.

20 Claims, 7 Drawing Sheets

CACHE-OPTIMIZED HASH TABLE DATA STRUCTURE

TECHNICAL FIELD

Various exemplary embodiments disclosed herein relate generally to hash tables, memory management, and associated data structures.

BACKGROUND

Hash tables are data structures that map keys to values. By using a hash function to compute an index into an array of slots, a value may be found within a hash table. A cache may be used by a central processing unit (CPU) of a computer to reduce the average time to access data from main memory. A cache is much smaller than main memory, and accessing the cache is much faster, and so may be used to store copies of data from frequently used main memory locations.

SUMMARY

In light of the present need for efficient hashing optimized to modern caches, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a system for hashing a value into a cache, the system including a processor for performing a series of instructions; a memory; and the cache including a plurality of slots, each slot including two locations to store values, each location including a tag value and an index, the cache in communication with the memory and the processor, the cache configured to calculate a target slot in the cache for an object; determine if a location is available; store a characteristic of the object in the index of the location; and update the tag value of the location. In some embodiments, the cache is further configured to determine that a first location of the target slot is available, when determining if the location is available; the cache is further configured to store the characteristic of the object in the index of the first location of the target slot, when storing the characteristic of the object; and the cache is further configured to set a self bit of the tag value of the target slot, when updating the tag value of the location.

In other embodiments, when determining if the location is available, the cache is further configured to determine that a first location of the target slot is not available, and determine that an alternative location is available. In alternative embodiments, the cache is further configured to store the characteristic of the object in the index of the alternative location, when storing the characteristic of the object; and the cache is further configured to set a bit of the tag value of the alternative location to indicate the target slot, when updating the tag value of the location. In further embodiments, the cache is further configured to update the tag value of the first location of the target slot to indicate a slot of the alternative line. In other embodiments, the cache is further configured to determine a memory location based upon the characteristic of the object; and store the object in the memory location.

Various exemplary embodiments relate to a system for removing a value hashed into a cache in a location, the system including a processor for performing a series of instructions; a memory; and the cache including a plurality of slots, each slot including two locations, each location including a tag value and an index, the cache in communication with the memory and the processor, the cache configured to calculate a target slot in the cache for an object; determine that a characteristic of an object is stored in a first location in a first slot in the cache; determine if the first location is a primary location of the target slot; and update a first index and a first tag value of the first location. In some embodiments, the cache is further configured to determine the first location is a primary location of the target slot, when determining if the first location is a primary location of the target slot; determine that a second location contains a characteristic of another object with the target slot; move a second index of the second location to the first index, when updating an index and a tag value of the first location; and clear the second location. In alternative embodiments, the cache is further configured to determine that a third location of an alternative slot of the second location does not contain a characteristic of a third object with the target slot; and clear a bit indicating the alternative slot, when updating an index and a tag value of the first location.

In other embodiments, the cache is further configured to determine the first location is not a primary location of the target slot, when determining if the first location is the primary location of the target slot; and clear the first location. In alternative embodiments, the cache is further configured to determine that a second location of an alternative slot of the first location does not contain a characteristic of a second object with the target slot; and clear a bit indicating the alternative slot in the tag value of the primary location of the target slot.

Various exemplary embodiments relate to an apparatus for updating a hash table, the apparatus including a processor; a memory; and a cache memory including one or more cache lines; and a hash table allocated within a cache line, the hash table including a number of slots, each slot including two locations, and each location including a tag value and an index. In some embodiments, each cache line includes $2^n$ bytes of memory, wherein n is an integer; and the hash table includes $2^m$ slots, wherein m is an integer and m is less than n, each slot includes $2^{(n-m)}$ bytes, and each location includes $2^{(n-m-k)}$ bytes, wherein k is an integer greater than or equal to zero and k is less than or equal to n−m. In some further embodiments, each cache line includes sixty-four bytes of memory; and the hash table includes eight slots, each slot includes eight bytes, and each value includes thirty-two bits. In some alternative embodiments, each tag value includes $2^m$ bits, and each index includes $2^{(3+n-m-k)}-2^m$ bits. In some further embodiments, each tag value includes eight bits, and each index includes twenty-four bits.

Some embodiments, further include one or more bits allocated within each cache line, the bits including a lock indicating that parallel modifications within that cache line are prohibited. In alternative embodiments, the lock includes one bit. In some embodiments, each index includes a pointer to an object. In other embodiments, each tag value includes a bit mask.

It should be apparent that, in this manner, various exemplary embodiments enable cache-optimized efficient hashing. In particular, by providing a data structure and management methods that optimize entries corresponding to values that hash to the same index to be stored within cache lines.

BRIEF DESCRIPTION OF THE DRAWINGS

In order to better understand various exemplary embodiments, reference is made to the accompanying drawings, wherein.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to hashes within cache lines, it will be understood that the techniques and arrangements described herein may be implemented to facilitate hashing in other types of systems that implement multiple types of data processing or data structure.

Hash tables are data structures that map keys to values or objects. By using a hash function to compute an index into an array of slots, a value may be stored and later found within a hash table. In an ideal case, a hash function will assign each key to a unique slot, but in actual practice some keys will hash to the same slot. Thus, accommodations must be made for the occurrences where different keys are assigned by the hash function to the same slot.

Hash collisions may result in hash values that hash to the same slot being stored in different locations. It may be preferable to store hash values that hash to the same slot to memory locations that are close to one another for a variety of reasons; among them, modern caches are typically optimized for data locality, so if required data is grouped together within a certain memory area, it may be accessed more quickly. Additionally, because smaller caches may be accessed more quickly, but may hold less data than may be needed, a cache is usually organized as a hierarchy, with small fast caches backed up by larger, slower caches. Generally when information is required the smallest, fastest, level 1 (L1) cache is checked first; if that cache misses, the next fastest and larger cache, level 2 (L2) is checked, and so on, until external memory is checked. Smaller hash tables are more likely to fit within a lower-level cache, and thus be accessed more quickly. Thus, it may be beneficial to pack hash table data into as small an area of memory as possible, such that it has a higher probability of fitting into a lower level cache, preferably L1. Also, by packing a data structure into as little memory as possible, it may be more likely that data will be located close to each other within memory, speeding memory access of objects relative to each other as described below.

Because speed may be driven by both choice of cache line and relative closeness of related keys in memory, various hash functions attempt to achieve speed and closeness in key storage. However, there are structural deficiencies in various known hashes that produce inefficiencies. For example, Cuckoo hashing requires two memory accesses to different cache lines in order to determine that a given key is not present. Therefore, Cuckoo hashing generates many cache misses and may require up to twice the amount of memory bus traffic if the data set does not fit in the cache. In an application that uses many hash table lookups, if under normal circumstances the lookup returns no match, the efficiency cost may be high. In addition, insertion may lead to a long (unbounded) series of moves in a random pattern across the hash table, leading to poor worst case performance, complex locking and potentially costly rehashing.

Hopscotch hashing avoids the double memory access for a non-existing item, but may require a long sequence of moves to insert an item in its 'neighborhood', and may require a resize/rehash operation if no such moves are possible. Because hopscotch hashing considers the neighborhood of a given slot to be the H-1 next slots (as opposed to preceding slots), operations may cross cache line boundaries, and may require multiple bucket/segment locks to be acquired/released per operation.

In view of the foregoing, it would be desirable to use a hash table that fits into the smallest cache level available, while minimizing the number of different cache lines addressed for each operation. In particular, it would be desirable to optimize a hash table to fit within smaller caches.

Referring now to the drawings, in which like numerals refer to like components or steps, there are disclosed broad aspects of various exemplary embodiments.

Figure 1:
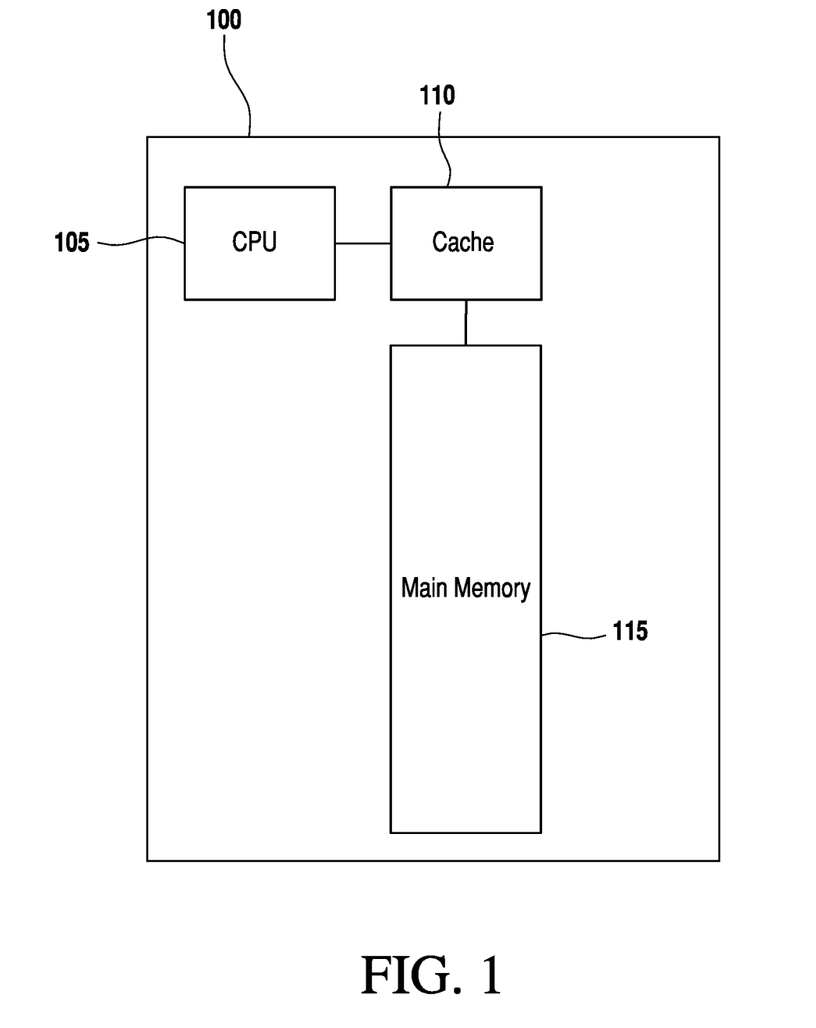
FIG. 1 illustrates an exemplary arrangement of a cache in relation to a central processing unit and main memory.

FIG. 1 illustrates an exemplary arrangement 100 of a cache 110 in relation to a central processing unit (CPU) or processor 105 and main memory 115. Data may be read from main memory 115 into the cache 110, and read by the CPU 105 from the cache 110. Likewise, data may be written by the CPU first into the cache 110, and written from the cache 110 to main memory 115. Requests from the CPU 105 to the cache 110 may be based on memory location. Note that although cache 110 is shown as separate from CPU 105, cache 110 may be built into the CPU 105, and/or multiple cache levels may exist, for example, a level 1 (L1) cache may be built into the CPU, and a level 2 (L2) cache may be separate from the CPU. There may be additional connections in arrangement 100 that are not shown, for example, between CPU 105 and main memory 115, between cache levels, and between different cache levels and main memory 115 and/or CPU 105. Persons of ordinary skill in the art will appreciate that other cache arrangements are possible.

The processor 105 may be any hardware device capable of executing instructions stored in cache 110 or storage 115, or a memory (not shown). As such, the processor may include a microprocessor, field programmable gate array (FPGA), application-specific integrated circuit (ASIC), or other similar devices.

A memory may include various memories such as, a cache 110, for example L1, L2, or L3 cache or system memory. As such, a memory may include static random access memory (SRAM), dynamic RAM (DRAM), flash memory, read only memory (ROM), or other similar memory devices.

The storage 115 may include one or more machine-readable storage media such as read-only memory (ROM), random-access memory (RAM), magnetic disk storage media, optical storage media, flash-memory devices, or similar storage media. In various embodiments, the storage 115 may store instructions for execution by the processor 105 or data upon which the processor 105 may operate.

Figure 2:
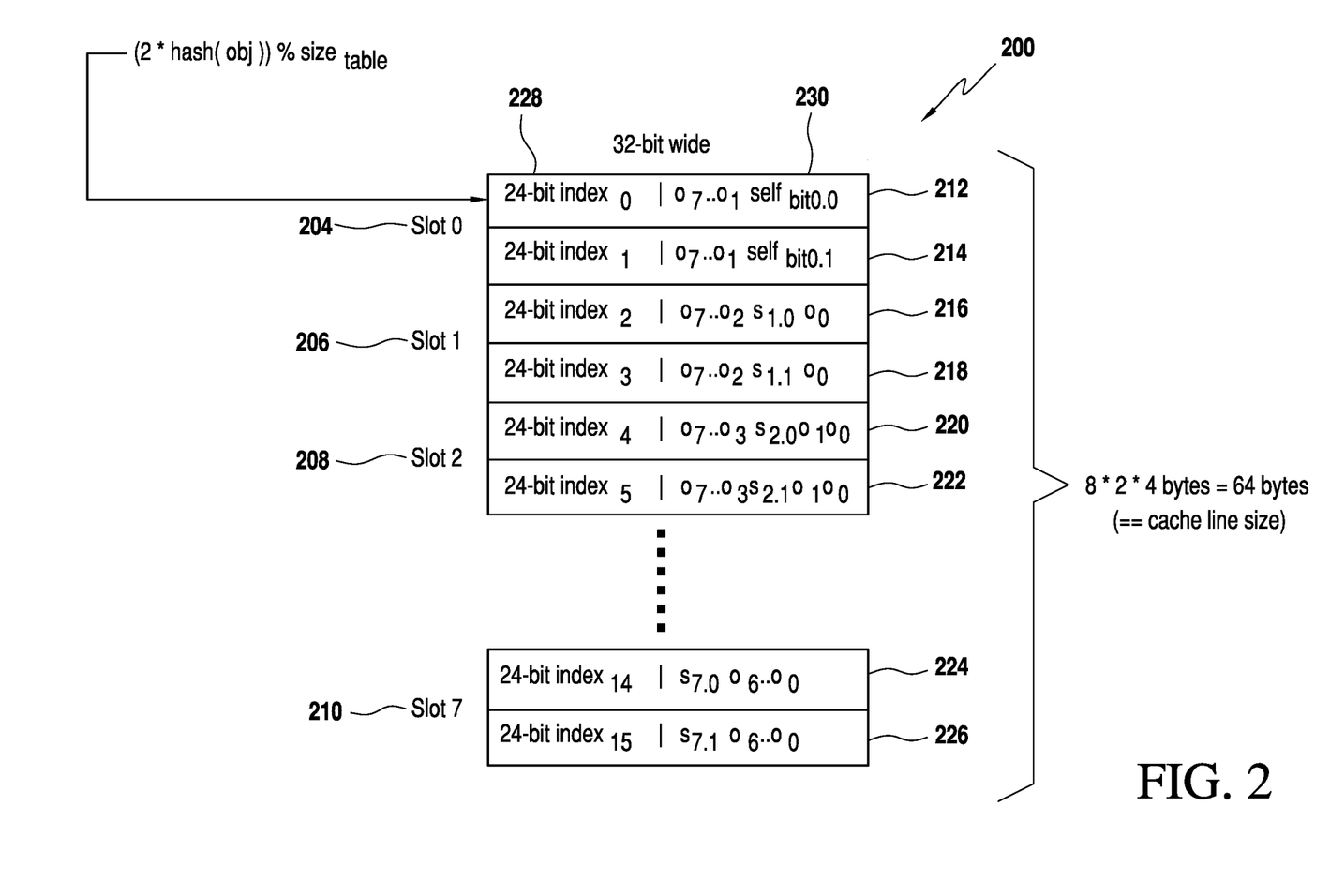
FIG. 2 illustrates an exemplary cache-optimized hash table data structure.

FIG. 2 illustrates an exemplary cache-optimized hash table data structure 200. An associative array may align well with 64-byte CPU caching schemes. On many modern cache architectures, the size of each line in a cache such as cache 104 is 64 bytes. Data structure 200 may be organized so that within these 64 bytes there are 8 slots 0-7 such as slots 204, 206, 208, 210, where each slot may be 8 bytes, or 64 bits. Further, each slot of 64 bits may accommodate two values of 32 bits such as 212 and 214, 216 and 218, 220 and 222, and 224 and 226, where the 32 bits may include an 8-bit tag value 230 and a 24-bit index 228 into an object table, or a pointer to an object, or the object value itself if it fits within 24 bits. Thus, in some embodiments, each slot, for example, slot 0 204, may contain two primary 212 and secondary 214 spaces each with its own index 228 and tag 230, where each tag 230 may be a bit mask indicating which other slots within the 64 byte area 200 might contain the index to the object that is being searched for. As such, the hash table data structure would consist of 16 fields of 4 bytes each.

As will be shown below, with eight slots within a 64-byte cache line there may be eight possible locations where an object could hash to for a given function; each location may include a primary and a secondary slot, but as will be shown, within certain constraints, given a hash function, any object may be stored in a primary or secondary position within any of the slots 0-7. Thus, each cache line 200 may fit at most sixteen (16) items within the eight slots.

An empty hash table may be created with a given fixed size S. A given object O may be added to a hash table by calculating a hash function over its defining fields—for example, a "Person" Object might have a field "name" that uniquely identifies it; then the hash would be calculated over the name string. An index into the hash table may be calculated based on the hash value, and a pointer to O, or, as will be explained below with reference to overflow support, an index into another table containing O, may be stored in the hash table. A hash table may support 3 operations: 1) Get—given a key, check if an object with a matching key exists in the hash table, and if so, return a reference to it; 2) Put—add a given object under a given key; and 3) Remove—remove an object matching a given key. All operations on average may typically take a constant number of steps independent of the size or contents of the hash table, and thus may be of complexity O(1) on average. In particular, if the hash table does not contain a given key, a Get or Remove operation may take only three (3) steps and use only one (1) cache line memory access.

The 8-bit tag value 230 may function as follows. A tag value may have three possible states—1) if all of the bits are 0, then the slot is unused and the row is empty; 2) if the self bit is set on an even row (i.e. rows 0 212, 2 216, 4 220, 6, 8, 10, 12, or 14 224), the row is the head of a list, and all other bits that are set may indicate other slots where a value belonging to the same list may be stored; and 3) if exactly one bit is set, and it is not the self bit or the row is odd (i.e. rows 1 214, 3 218, 5 222, 7, 9, 11, 13, or 15 226), the row contains a member of a list with the head at the slot within the same cache line indicated by the bit set in the tag value.

When the hash table is created, all of the bits in the tag 230 may be set to 0. In a populated hash table, the tag value 230 may indicate the head of a list of values that hash to the same value, and in which slot those values reside. The slot that a given object hashes to may be called the primary slot, and other slots in the same cache line may be considered potential secondary slots for a given object. Thus, as already noted, a given object may exist in one of 16 entries, divided into 8 slots. As will be explained below, as objects are "put" into the hash table, objects will be stored first in the first line of their primary slot if it is available, such that lookup is easy and fast. The first line of a primary slot may be considered an "even" line or field, e.g. field 0 212 in slot 0 204 (which may include fields 0 212 and 1 214), field 2 216 of slot 1 206 (which may include fields 2 216 and 3 218), field 4 220 of slot 2 208 (which may include fields 4 220 and 5 222), and so on through field 14 224 of slot 7 210. Conversely, the second line of a slot may be considered an "odd" line or field, e.g. field 1 214 in slot 0 204, field 3 218 in slot 1 206, and so on. Because objects will be preferentially stored in the first line of their primary slot, if multiple objects hash to the same value, the head of a list of the values that hash to the same spot will necessarily reside in an "even" field. For each 8-bit tag 230, the 'self' bit will correspond to the slot number within the map. As such, for slot 0 the 'self' bit may be indicated by 0b00000001, for slot 1 the 'self' bit may be indicated by 0b00000010, for slot 2 the 'self' bit may be indicated by 0b00000100, etc. If the 'self' bit is set within the tag 230, it will indicate that both of the following conditions are true: 1) the index field 228 is valid and 2) the 8-bit value 230 in the primary (even) field for the slot represents a bitmap indicating 0 or more other slots that contain values with the same hash value. If the 'self' bit is not set within the tag 230 but exactly one of the other $O_7 \ldots O_1$ bits is set, the value is a short-distance pointer to the original slot within the data structure in the same cache line that the index hashed to (i.e. for a value stored in slot 0, $O_1$ may be set if it contains an index to the primary slot, slot 1, to which the hash value maps).

Put another way, a tag value will have different meanings depending on whether the value is the head of the list. The self bit may indicate whether the entry is the head of the list. Only the head of the list may include in its tag the map for all of the slots that are allocated to the list. The self bit will correspond in position to itself within the slots, where the self-bit refers to the row position, but the remaining bits 0-7 will refer to the bit position. If an object occupies a slot, and it is not the head of the list, then all of the tag bits except the bit for the head of the list will be 0, with a 1 indicating the head of the list. For the field that stores the head of the list, the self bit will be 1, and there will be a map indicating a 1 for all of the occupied slots (and a 0 if the slot is not occupied by an object belonging to the same list). It may be understood that every bit within a tag map $O_7 \ldots O_1$ refers to one slot and two fields. Note that in a tag for the head of the list, a 1 in the map for any bit other than the self bit will indicate that the slot is occupied, but not whether it is full—it will indicate that at least one of the two fields within the slot is occupied, but not whether the slot is full, e.g. whether both fields in the slot are occupied.

As described above, tag values may be small because they are pointing within the same cache line; thus the tag value may be considered a short-distance pointer, encoded in such a way that the tag value by itself may be used to determine whether it is the head of the list or not, and if not, where the head of the list resides. In some embodiments, instead of using a bit mask, an index of the row that contains the head may be used, e.g. a value from 0-15 indicating the position of the head of the list; in that case only five bits may be used instead of eight: four bits for the index value, and a single bit for the self bit. However, in such an index the map may not be as accurate.

A person of skill in the art may understand that some memory architectures may use CPU caching schemes using other byte sizes. Thus, the data structures and methods described herein may be applicable to caching schemes using other byte sizes. Relative sizes may be extrapolated, such that in other embodiments, each cache line may include $2^n$ bytes of memory (i.e. a power of 2 where n is an integer). In such a caching scheme the hash table may include $2^m$ slots (where m is an integer and m<n), each slot may include $2^{(n-m)}$ bytes, and each location may include $2^{(n-m-k)}$ bytes (where k is an integer and $0 \le k \le (n-m)$). As an example, n=6, m=3, k=1. Thus, it follows that each tag value may include $2^m$ bits, and each index may include $2^{(3+n-m-k)} - 2^m$ bits.

Figure 3:
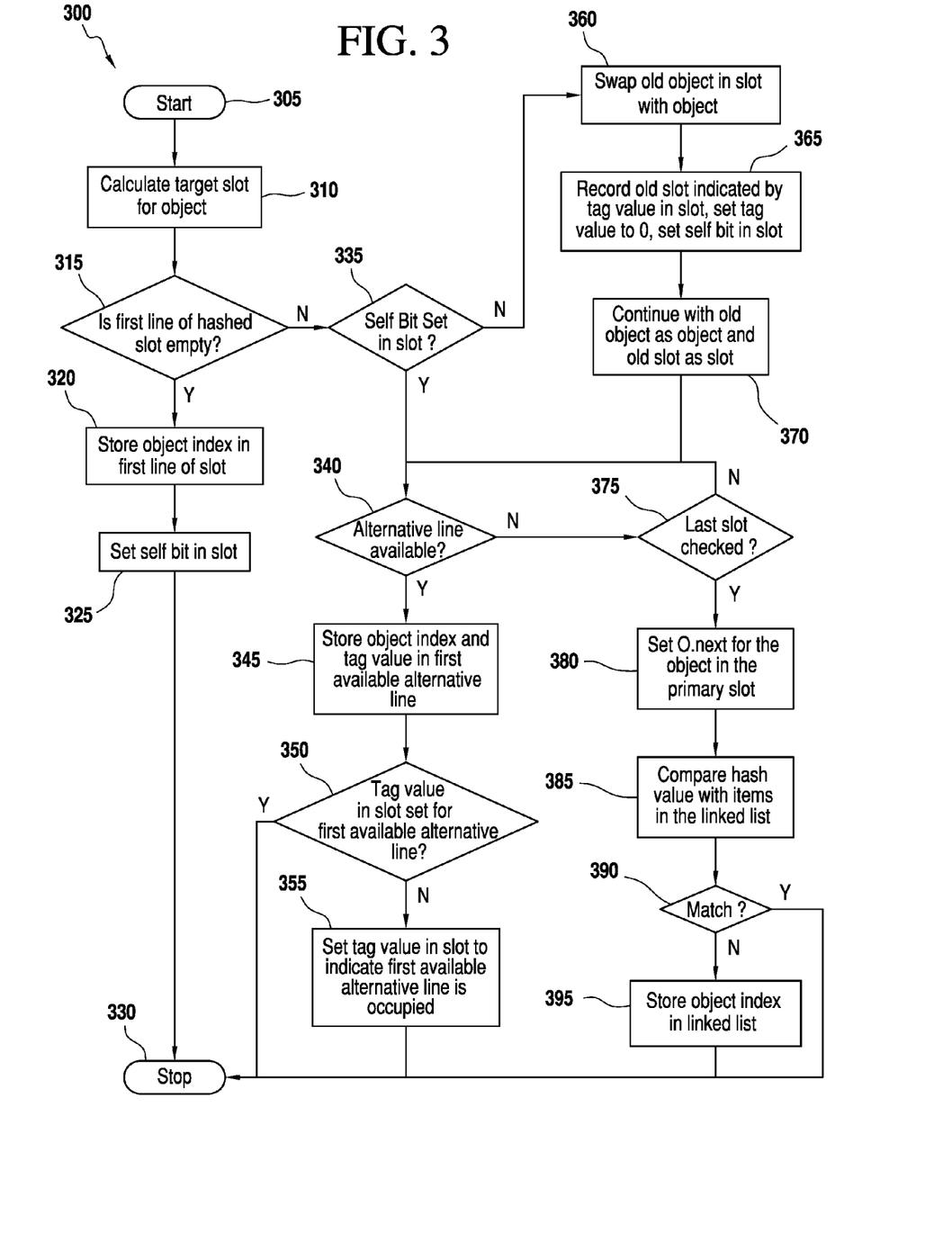
FIG. 3 illustrates an exemplary method for inserting an object into a hash table in a cache.

FIG. 3 illustrates an exemplary method 300 for inserting an object into a hash table in a cache. The method may start at step 305. At step 310, a target slot S for an object O may be calculated. In one embodiment, a target slot S may be calculated for an object O by taking twice the object's hash value hash(O) modulo the table size (e.g. (2*hash(obj)) % $size_{table}$). If it is determined 315 that the first line of that slot S is empty (i.e. the value of all 32 bits==0 and/or the value of the eight tag bits==0), at step 320 the index for O may be stored in the empty first line of slot S, and at step 325 the 'self' bit may be set in the tag value for the first line of slot S, indicating that Slot S is the head of the list of hash values to which O hashes, after which the method may end 330. If it is determined at step 315 that the first line of that slot S is not empty (e.g. the value of all 32 bits≠0 and/or the value of one or more of the eight tag bits==1), in step 335 it is determined if the 'self' bit is already set it in the tag value of slot S, meaning another object $O_2$ also hashed to the same primary slot before the object was added, and $O_2$ forms the head of the list that O hashes to.

In step 340, if the 'self' bit was set for slot S, the method may search for an alternative line, starting with odd lines (i.e. the second line of slot 0 214, 1 218, 2 222, and so on through 7 226) and then the even lines (excluding the first line in slot S). In some embodiments, the first odd line after slot S may be checked first, then all of the other odd lines starting with 1 (if slot S is not slot 0 204); in other embodiments, the odd lines may be checked sequentially starting with the first secondary field 214, followed by the even lines (skipping the primary field of slot S). Note that in some embodiments, the tag value may be used to optimize the order in which lines are checked (e.g. the method may start with slots that are not marked as containing an object belonging to the same list). As will be explained below, adding first to alternative odd lines may make future insertions and locates more efficient (e.g., more likely to require fewer steps). For every line checked that is full, the method will determine if that line is the last slot to be checked in the cache line (e.g., if all sixteen (16) slots have been checked); if not, it will return to step 340. If an empty alternative line is found, at step 345 the index for O is stored in the empty alternative line, and the tag value in the alternative line will be set for the slot S at the head of the list, which will be the slot the object O originally hashed to. At step 350 it may be determined whether the tag value for slot S is already set to 1 for the bit corresponding to the first available alternative line $O_1$ to $O_7$; if so, the method ends 330; if not, in step 355 the tag value for slot S is changed so the bit for the first available alternative slot $O_1$ to $O_7$ is set, and the method may end 330.

If at steps 315 and 335 it is determined that slot S is occupied by another value $O_2$ but the 'self' bit was not set, e.g. only one of the remaining bits was set $O_1$ to $O_7$ indicating the primary slot for $O_2$), then $O_2$ will be a value that hashed to another slot $S_2$ and the first line of slot S will have been the first available empty position when $O_2$ was added to the hash table. In this case, no other object will have yet been hashed to the slot S that O hashed to, and slot S will be the head of the list for object O. The method will be efficient if the head of the list is always in a primary line (see note below). Thus, at step 360, the objects O and $O_2$ will be swapped such that object O will be stored in the index value 228 in the primary line of slot S, in step 365 the method will record the tag value indicating the slot at the head of the list for object $O_2$ and then overwrite the tag value (e.g. set the tag value==0), and then set the self bit for the tag value of slot S. At step 370, object $O_2$ may become the new object O to be inserted and the slot indicated by the recorded old tag value may become S for the remaining steps when the method continues to step 340 as described above. As such, by replacing any existing object that is stored in a primary slot but that is not the head of a list (e.g. the self bit is not set) when a new object hashes to that slot (and is thus the head of the list), all objects that are at the head of a list will be stored in the primary slot that the object hashed to.

As noted above, the head of a list of objects that hash to a slot S may always be on an even line (e.g. 212, 216, 220 . . . 224) so that, there are at most eight (8) positions in a cache line where the head of a list may be located; in this embodiment, a head of a list will never be in a secondary position (e.g. 214, 218, 222 . . . 226) within a slot. As such, in the worst case where a cache line is filled by a hash table, there will be eight different object lists starting in a cache line such that eight different object lists start in the same cache line, with each of those lists containing two objects. In another case, there may be one list where all of the secondary positions within the cache line may be filled with overflowing objects that hash to one slot, and seven lists of only one object each such that the remaining primary positions within the seven remaining slots are filled, e.g. seven lists of one object each and one list of nine objects, all in the same cache line. Note that in either case, because the method attempts to place overflow objects into odd lines first, the eight (8) overflow values will all appear in odd lines, to increase the chance that when a newly hashed object is added, the head of the list is open (shortening processing time); regardless, the eight values that hashed first will appear as the heads of their respective lists in even lines.

If it is determined at step 375 that the last line has been checked and the cache line is full, in one embodiment (not shown) an error is reported, and the method ends 330. In another embodiment, an overflow condition is supported and the data structure may revert to a linked list as described below.

In fact, two different conditions may be considered "overflow"—as described above, in an initial overflow case, if an object O hashes to the same value as another object $O_2$, where $O_2$ is the head of the list, as described above the index for object O may flow to one of the secondary locations such that if there are a number objects that hash to the same index in a slot S within the same 64-byte cache line, there is room to hash a number of those objects before running out of space in the cache line. In such an overflow case where the hash table remains within the cache line, when iterating over the objects for an insertion, locate, or, delete, only a single cache line must be addressed; as opposed to a linked list that may have addresses over several cache lines; in the worst case, a linked list may require access to as many cache lines as the number of objects being referenced. Because of the data structure described above, each slot contains two indexes and two bit maps in order to allow for room to maneuver in such an initial overflow case. This may be dissimilar to other addressing schemes because the address space used for pointers is typically much larger, e.g. as many bits as the address space is wide, so 64-bit CPUs would have 64 bit addresses for a pointer. If the data is packed too tightly, there will not be enough space for all of the values, which will force the data across cache line, lessening the efficiency of the hash table; essentially the same problem will recur, of spreading objects across cache lines. By having eight slots with two positions each for a hash index value, the method will initially pick the first one available within the cache line.

In the other example of an overflow case that does not fit within a single cache line, if in step 375 the cache line is full such that all of the slots are occupied, at step 380 the method will revert to a linked list by setting O.next for the object in the primary slot for object O, where the O.next field may be part of the object referenced by the index of the primary entry. From this point the method will revert to the behavior necessary to maintain the linked list. As such, at step 385 the hash value may be compared to the objects in the list referenced by the index of the primary entry. If there is a match (step 390), then the method may end 330. Otherwise, in step 395 the object may be stored at the end of the linked list, and the method may end 330. In some embodiments, when inserting an object O, duplicate entries may be supported such that the same object index may be inserted into the hash table multiple times. However, hash values may not be overwritten—if for example, a very poor hash function is used, or the data set all happens to hash to the same value, at some point the method may end up with all of the rows in the cache line occupied, causing an overflow situation as described above.

Thus, in the worst case the algorithm may result in performance that is the same as standard hashing, however, an overflow over the cache line may occur only under rare circumstances, so the average performance will be better for the algorithm as a whole; only in worst cases will the worst case performance be the same as standard hashing. In other words, standard hashing may occur in rare situations, but in other than worst-case scenarios the method will be unlike standard hashing.

The above method is exemplary for one cache line. As described above, it is preferable that a hash table be allocated within a cache line, but in some instances a hash table may require a minimum number of cache lines greater than one. Thus, in some embodiments an array of objects may be pre-allocated into contiguous memory at method startup. It may be convenient to pre-allocate objects such that they have an index from 0 until the number of objects minus 1, and then those indexes are put into the hash table. This allows the use of small "tag" values as indicated above—because fully dynamic memory requires 64 bits, indicating the full position of the object would exceed the size available within the data structure, so the array of objects may be pre-allocated in order to make the size of the pointer smaller. As described above and below, a simple bitmap may be used to allocate and/or free object instances from the pre-allocated array, so a given object may be initialized and inserted into the hash table. By pre-allocating the hash table, the maximum load of the hash table may be bounded, and the size of the hash table may be chosen as 2 times the number of objects in the pre-allocated array, such that hash table load can never go beyond 50% as follows.

At any one point if there are n objects in an array, there will be at most n entries in the hash table. Each object may only be added once, and at most all objects can be added to the hash table. So, if the hash table has two times as many rows as there are objects in the object array, there will be a good chance that a particular cache line won't run out of space when objects are hashed. Note that in some embodiments the hash table may consist of a number of cache lines; each cache line can hold 16 objects; thus, if the object array is 16 objects, you may use two cache lines, providing room for 32 objects, such that the maximum load may be 16 (because at most, all of the objects may be inserted only once); so there would be a hash table consisting of two cache lines. Unless the choice of hash function was very unlucky, the objects in the hash table should be distributed between the cache lines. If two cache lines are allocated, there will be 16 slots; if four cache lines are allocated, there will be 32 slots, where each slot consists of 2 rows each.

Figure 4:
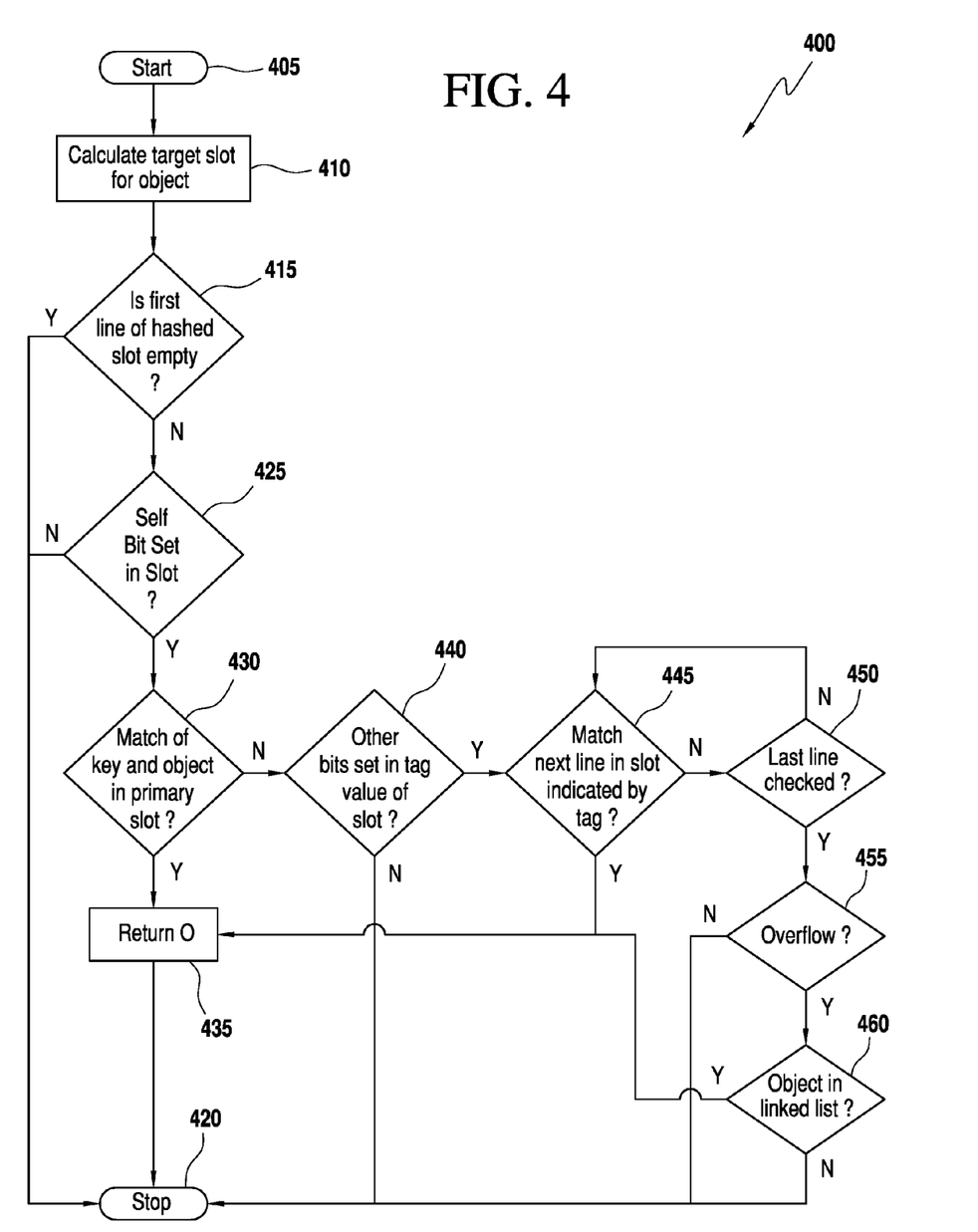
FIG. 4 illustrates an exemplary method for determining if a target object is stored in a hash table in a cache.

FIG. 4 illustrates an exemplary method 400 for determining if a target object O is stored in a hash table in a cache. The method may start at step 405. At step 410, a target slot S for an object O may be calculated using the same hash function used to insert objects into the hash table. In one embodiment, a target slot S may be calculated for an object O by taking twice the object's hash value hash(O) modulo the table size (e.g. (2*hash(obj)) % size$_{table}$). At step 415, the value of slot S may be checked. If the slot is empty, e.g., the 32-bit value=0, the given key does not exist in the hash table, and the method may end 420. Otherwise, if the self bit is not set at step 425, the given key likewise does not exist in the hash table, and the method may end 420. If the self bit is set at step 425, at step 430 the key may be compared against the object O referenced by the index of the first line in S, and if there is no match, then in the second line of S. If there is a match for either line of slot S, at step 435 O may be returned, and the method end 420. If there is no match at step 430, at step 440 if there are no bits (e.g. $O_1 \ldots O_7$) other than the self bit set in the tag value, then the given key does not exist in the hash table, and the method may end 420. Otherwise, recall that the other 7 bits within the 8 bit tag value (bitmap) that are set to 1 refer to additional slots that contain objects that also hash to the same slot, thus, at steps 445 to 450, the method may iteratively check each of the slots corresponding to the bits set in the tag value by comparing the key against both lines; first against all odd lines, and then against even ones; except in some embodiments the method may first verify that in the tag value for the line to be checked, the tag value matches the slot S to which the target object originally hashed. Note also that because there are fourteen lines besides the two lines of slot S, steps 445 to 450 may not repeat more than fourteen times. If all of the lines have been checked, at step 455, if overflow is not detected (e.g. O.next is not set for the object in the primary slot), the method may end at step 420. Thus, there are a limited number of slots within a single cache line that may be checked if there is no overflow (or if overflow is not supported by the embodiment). Otherwise, if overflow is detected (e.g. O.next is set for the object in the primary slot, with the "O.next" field being part of the object referenced by the index of the primary entry), at step 460 the key may be compared with all items in the linked list by following O.next pointers (see FIG. 5). If a matching object O is found in the linked list, it may be returned at step 435; if none of the objects in the linked list match, the method may end 420.

As may be understood from the method 400, in case of a lookup for a non-existing object, only one access of a single cache line may be necessary—if the first slot checked is empty, it means that the object is not in the table, and no other slots must be checked; a single memory read may establish that the object is not in the table. If the first slot is not empty, the method may check if there is a match, because the list may have an object that happens to have the same hash value but a different key. But the hash calculation itself need only be run once, because after step 410 it may be seen that in steps 415 through 450 only bits are compared; there may be multiple memory reads, but all will occur within the same cache line. Note that in some applications, lookups for non-existing objects may be common, so it is beneficial to optimize the method for that case. In method 400, it may be seen that one read of the cache line, or multiple reads of the same cache line, may be needed to establish that a given key returns no match, but these operations should be highly efficient because either the object is entirely absent or references to potential matches are found within the same cache line in the majority of cases.

Figure 5:
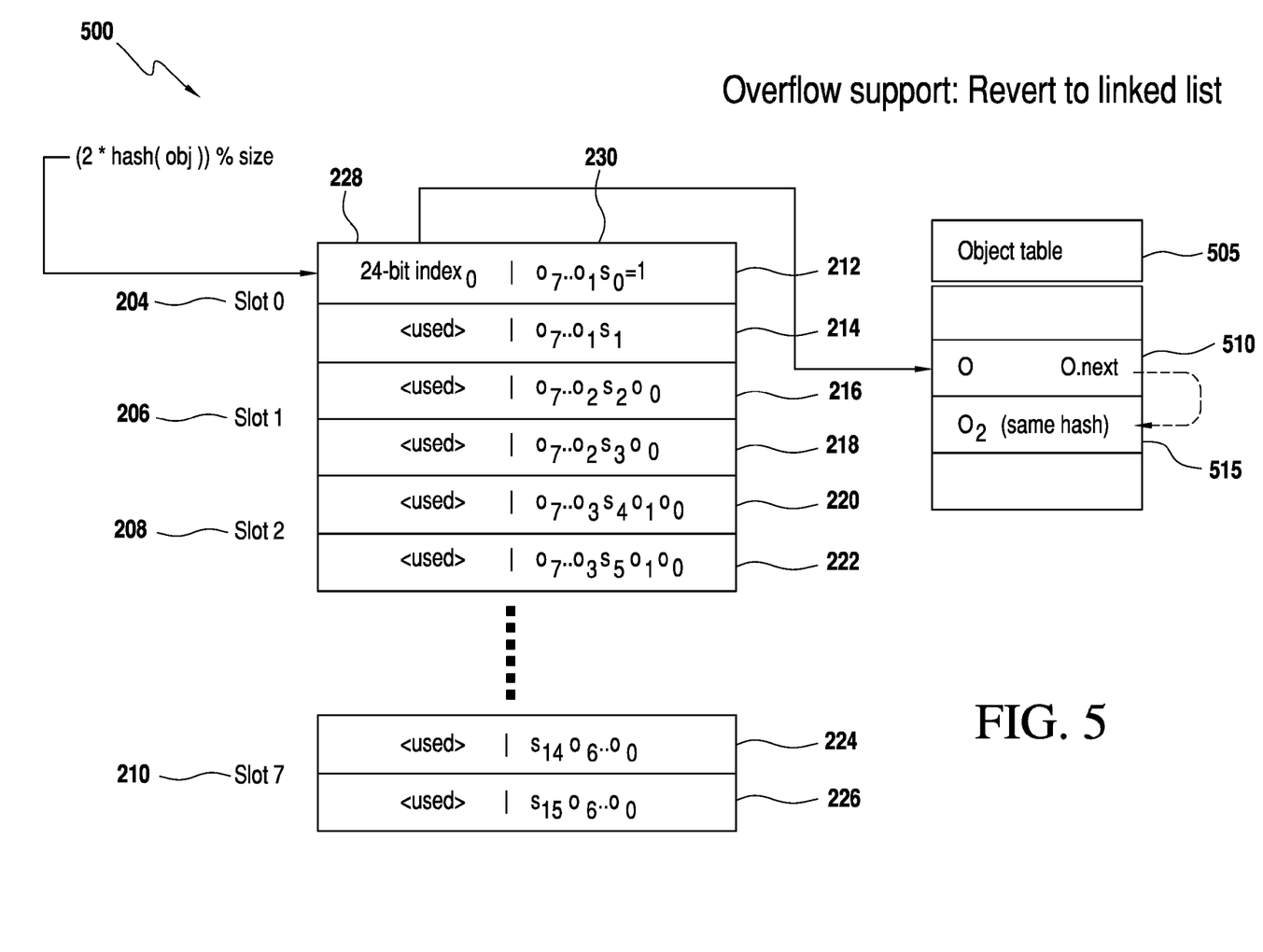
FIG. 5 illustrates an exemplary cache-optimized hash table data structure in an overflow situation.

FIG. 5 illustrates an exemplary cache-optimized hash table data structure 500 in an overflow situation. FIG. 5 may correspond to FIG. 2, in a situation where all of the lines 212 through 226 in slots 204 through 210 may be filled with index values and some values have outgrown the cache line to create an overflow. The index 228 at the head of a list in a slot S such as slot 0 204 may point to an object table 505 which may be a linked list where the first value of the linked list 510 may be a value O.next, followed by as many overflow values $O_2$ 515 through $O_n$ that also hash to slot S. Thus, in an overflow situation the data structure within the cache line may remain the same, but there may be an additional linked list for all of the objects that could not be fit into the cache line. Thus, the index of the object at the head of the list would become a pointer in memory—not to the same cache line; but it should be rare that this occurs. The linked list 505 itself may be structured in a variety of ways—note that the first entry of the cache line in slot S may be considered the first pointer in the linked list, because it would point to the overflow table 505. Object table 505 may be an array of objects, where the table may use full pointers, or may use shorter indexes and put each list entry in consecutive memory locations. Thus, if the sixteen lines in the hash table are full, as described above at step 455, a method may check to see if there is a linked list at a location based on the value stored in the lead hash slot S.

Figure 6:
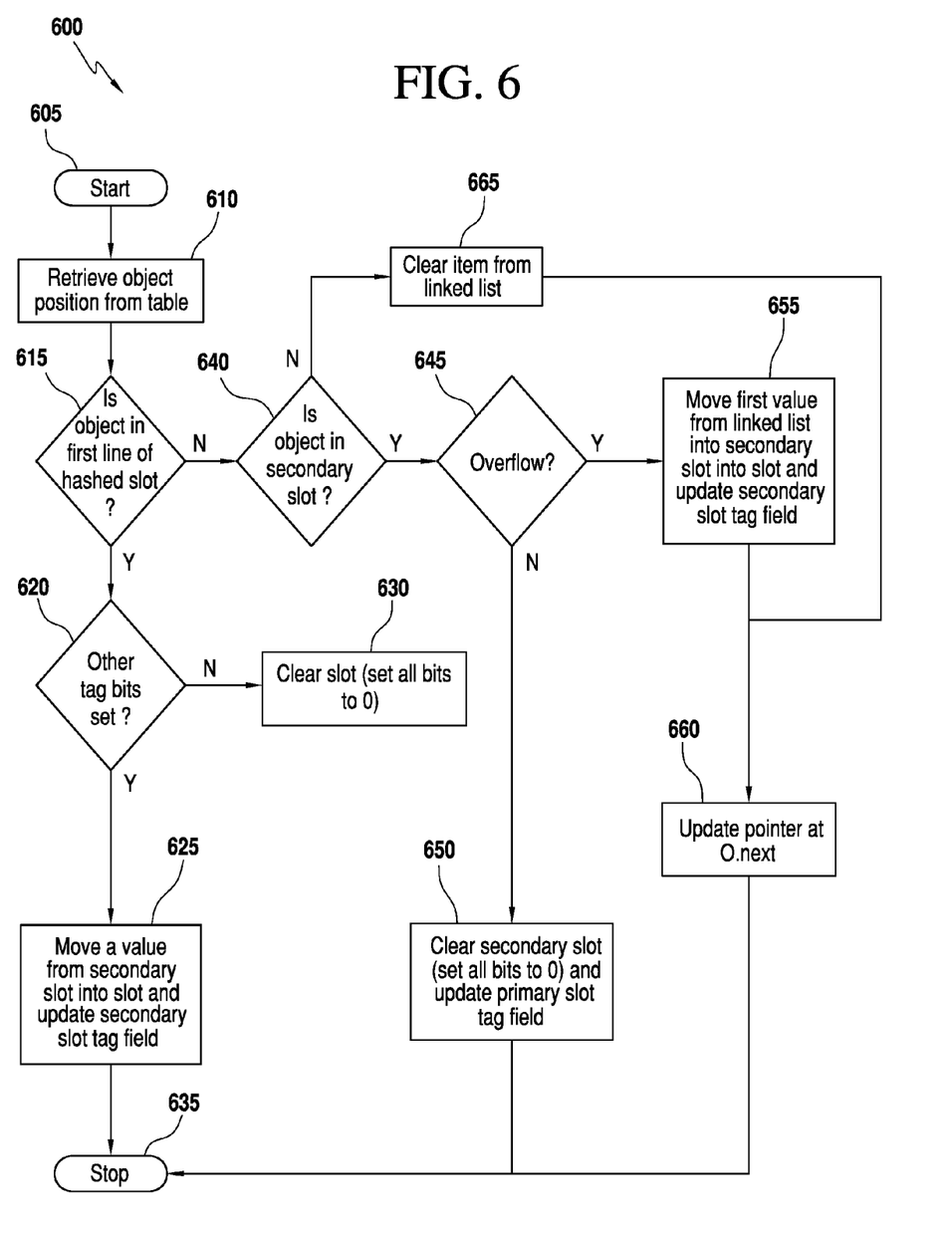
FIG. 6 illustrates an exemplary method for removing an object from a hash table in a cache.

FIG. 6 illustrates an exemplary method 600 for removing an object from a hash table in a cache. The method may start at step 605. As an initial step 610, the method may perform a retrieval similar to the method described in FIG. 4 in order to locate the object to be removed $O_{rem}$ in the hash table. In step 615, it is checked whether $O_{rem}$ is in the primary slot S (e.g. the self bit is set and O is stored as the head of a list or in the secondary line of slot S). If $O_{rem}$ is the head of the list, then in step 620 the remaining tag bits in the tag value may be checked to determine whether any other objects are within the hash list (such that they hashed to the same hash value). If so, in step 625 one of the values in an indicated slot may be moved into the primary slot and the tag field in the primary slot updated (e.g. clear the bit associated with the secondary slot); if there were no tag bits set but there is a value in the secondary line of slot S, the value in the secondary line may be moved to the first line. Thus, it may be ensured that there is always a head of a list so that if the head is removed, it is replaced it with some other object from that list, if there are any. If no other objects are found in step 620, at step 630 the primary slot S may be set to empty (all bits=0), after which the method may end 635.

If $O_{rem}$ is not in a primary slot at step 615, if at step 640 $O_{rem}$ is in a secondary slot then at step 645 the primary slot may be checked for overflow to determine if there is a linked list. If there is no overflow, at step 650 the secondary slot where $O_{rem}$ is stored may be cleared, the primary slot's tag field may be updated, and the method may end 635. If at step 645 it is determined that an overflow situation exists, at step 655 the first object in the linked list may be moved into the secondary slot that was occupied by $O_{rem}$, and at step 660 the previous next pointer to $O_{rem}$.next may be updated (possibly clearing the overflow situation in case there are no other objects in the linked list), after which the method may end 635. At step 640, if $O_{rem}$ is in the linked overflow list, at step 665 it may be removed from the list and the previous next pointer to $O_{rem}$.next may be updated at step 660 (possibly clearing the overflow situation in case there are no other objects in the linked list).

In some embodiments (not shown), locking may be added by reserving one of the 8 odd slots for a lock value, in which case, fifteen slots may be available for the hash table. Alternatively, the index could be made 1 bit smaller (e.g. 23 bits instead of 24) and a bit in one of the slots may be used as lock indicator.

Figure 7:
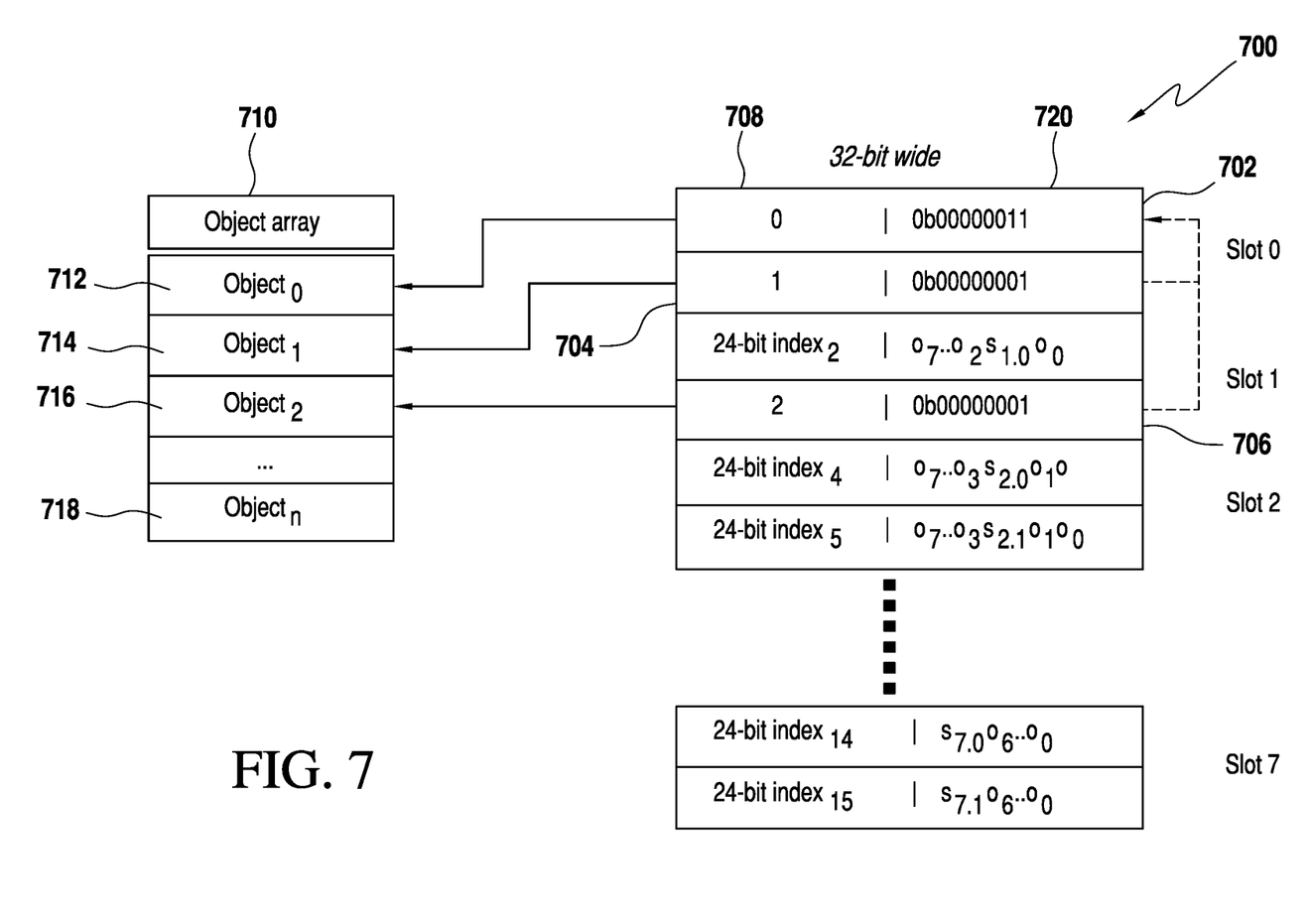
FIG. 7 illustrates an exemplary cache-optimized hash table data structure where several objects have hashed to the same slot.

FIG. 7 illustrates an exemplary cache-optimized hash table data structure 700 with three (3) objects all hashed to the same value into an initially empty cache line using methods similar to those described above. Data structure 700 may be similar to data structure 200. A first object $O_0$ may have been hashed into slot 0, and been stored in the primary line 702 of slot 0, and second and third objects $O_1$ and $O_2$ may have also hashed to slot 0 but been stored in secondary locations, the odd line of slot 0 704 and the odd line of slot 1 706, respectively. The 24-bit index 708 of each hashed object may refer to an object in the object array 710, for example, the index for $O_0$ may point to the object in the array at a position 712, the index for $O_1$ may point to the object in the array at a position 714, and the index for $O_2$ may point to the object in the array at a position 716. As noted above, the array 710 may have been pre-allocated, so there should be enough memory allocated for as many objects as may be needed, $O_1$ 712 to $O_n$ 718.

Each tag 720 may be a bit mask indicating which other slots within the 64 byte area contains objects that hash to the same slot as the object stored in the index 708, forming a list. Because the primary slot 702 is the head of the list, both the self bit is set, and a bit for each slot that may contain an object in the same list is set; in this example, slot 1 (by virtue of object $O_2$ stored in secondary line 706). The secondary line of slot 0 also stores an object in the list, and only the bit for slot 0 is set in the tag value 720 (note that although this may be considered a self bit, because a secondary slot may not be the head of a list, it may be understood that this bit in the secondary line of slot 0 704 refers to the primary line of slot 0 702). Likewise, the secondary line of slot 1 706 also stores an object in the list, and only the bit for slot 0 is set in the tag value 720.

According to the foregoing, various exemplary embodiments provide for space-efficient hashes. In particular, by providing a data structure and management methods that optimize references to objects with the same hash index to be stored within cache lines.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system comprising:
   a processor configured to perform a series of instructions;
   a memory; and
   the cache comprising a plurality of slots, each slot comprising two locations to store values, each location comprising a tag value and an index, the cache in communication with the memory and the processor, wherein the cache is configured to calculate a target slot in the cache for an object, determine if either of the two locations is available, store a characteristic of the object in the index of the available location, and update the tag value of the available location.

2. The system of claim 1, wherein the cache is further configured to determine that a first location of the target slot is available, store the characteristic of the object in the index of the first location of the target slot, when storing the characteristic of the object, and set a self bit of the tag value of the target slot, when updating the tag value of the available location.

3. The system of claim 1, wherein the cache is further configured to determine that a first location of the target slot is not available, and determine that an alternative location is available.

4. The system of claim 3, wherein the cache is further configured to store the characteristic of the object in the index of the alternative location, when storing the characteristic of the object and set a bit of the tag value of the alternative location to indicate the target slot, when updating the tag value of the available location.

5. The system of claim 4, wherein the cache is further configured to update the tag value of the first location of the target slot to indicate a slot of the alternative location.

6. The system of claim 4, wherein the cache is further configured to determine a memory location based upon the characteristic of the object and store the object in the determined memory location.

7. A system comprising:
   a processor configured to perform a series of instructions;
   a memory; and
   the cache comprising a plurality of slots, each slot comprising two locations, each location comprising a tag value and an index, the cache in communication with the memory and the processor, the cache configured to calculate a target slot in the cache for an object, determine that a characteristic of an object is stored in a first location in a first slot in the cache, determine if the first location is a primary location of the target slot, and update a first index and a first tag value of the first location.

8. The system of claim 7, wherein the cache is further configured to determine the first location is a primary location of the target slot, when determining if the first location is the primary location of the target slot, determine that a second location contains a characteristic of another object with the target slot, move a second index of the second location to the first index, when updating the first index and the first tag value of the first location, and clear the second location.

9. The system of claim 8, wherein the cache is further configured to determine that a third location of an alternative slot of the second location does not contain a characteristic of a third object with the target slot, and clear a bit indicating the alternative slot, when updating the first index and the first tag value of the first location.

10. The system of claim 7, wherein the cache is further configured to determine the first location is not the primary location of the target slot, when determining if the first location is the primary location of the target slot, and clear the first location.

11. The system of claim 10, wherein the cache is further configured to determine that a second location of an alternative slot of the first location does not contain a characteristic of a second object with the target slot and clear a bit indicating the alternative slot in the tag value of the primary location of the target slot.

12. An apparatus comprising:
    a processor;
    a memory; and
    a cache memory comprising: one or more cache lines; and a hash table allocated within a cache line, the hash table comprising a number of slots, each slot comprising two locations, and each location comprising a tag value and an index.

13. The apparatus of claim 12, wherein each cache line comprises $2^n$ bytes of memory, wherein n is an integer; and the hash table comprises $2^m$ slots, wherein m is an integer and m is less than n, each slot comprises $2^{(n-m)}$ bytes, and each location comprises $2^{(n-m-k)}$ bytes, wherein k is an integer greater than or equal to zero and k is less than or equal to n−m.

14. The apparatus of claim 13, wherein each cache line comprises sixty-four bytes of memory; and the hash table comprises eight slots, each slot comprises eight bytes, and each value comprises thirty-two bits.

15. The apparatus of claim 13, wherein each tag value comprises $2^m$ bits, and each index comprises $2^{(3+n-m-k)}-2^m$ bits.

16. The apparatus of claim 15, wherein each tag value comprises eight bits, and each index comprises twenty-four bits.

17. The apparatus of claim 12, further comprising one or more bits allocated within each cache line, the bits comprising a lock indicating that parallel modifications within that cache line are prohibited.

18. The apparatus of claim 17, wherein the lock comprises one bit.

19. The apparatus of claim 12, wherein each index comprises a pointer to an object.

20. The apparatus of claim 12, wherein each tag value comprises a bit mask.

* * * * *